US008578501B1

(12) United States Patent
Ogilvie

(10) Patent No.: US 8,578,501 B1
(45) Date of Patent: Nov. 5, 2013

(54) ANONYMOUS SOCIAL NETWORKING WITH COMMUNITY-BASED PRIVACY REVIEWS OBTAINED BY MEMBERS

(76) Inventor: John W. Ogilvie, Salt Lake City, UT (US)

(*) Notice: Subject to any disclaimer, the term of this patent is extended or adjusted under 35 U.S.C. 154(b) by 1476 days.

(21) Appl. No.: 11/870,475

(22) Filed: Oct. 11, 2007

Related U.S. Application Data

(60) Provisional application No. 60/865,757, filed on Nov. 14, 2006, provisional application No. 60/866,418, filed on Nov. 18, 2006, provisional application No. 60/868,619, filed on Dec. 5, 2006.

(51) Int. Cl.
*G06F 7/04* (2006.01)

(52) U.S. Cl.
USPC .......................................................... 726/26

(58) Field of Classification Search
USPC .................... 726/1, 2–10, 26–30; 705/2–3
See application file for complete search history.

(56) References Cited

U.S. PATENT DOCUMENTS

| 6,073,142 | A * | 6/2000 | Geiger et al. ................ 715/205 |
| 6,209,100 | B1 * | 3/2001 | Robertson et al. ................ 726/2 |
| 6,438,632 | B1 * | 8/2002 | Kikugawa ...................... 710/100 |
| 6,681,108 | B1 | 1/2004 | Terry et al. |
| 7,069,308 | B2 | 6/2006 | Abrams |
| 7,080,139 | B1 | 7/2006 | Briggs et al. |
| 2001/0034723 | A1 * | 10/2001 | Subramaniam ................. 705/74 |
| 2002/0023230 | A1 | 2/2002 | Bolnick et al. |
| 2004/0181434 | A1 * | 9/2004 | Kondo ............................... 705/2 |
| 2004/0215793 | A1 | 10/2004 | Ryan et al. |
| 2005/0038876 | A1 | 2/2005 | Chaudhuri |
| 2005/0165623 | A1 * | 7/2005 | Landi et al. ........................ 705/2 |
| 2005/0192999 | A1 | 9/2005 | Cook et al. |
| 2005/0236474 | A1 * | 10/2005 | Onuma et al. ................ 235/382 |
| 2005/0256866 | A1 | 11/2005 | Lu et al. |
| 2006/0004590 | A1 | 1/2006 | Khoo |
| 2006/0041543 | A1 | 2/2006 | Achlioptas |
| 2006/0042483 | A1 * | 3/2006 | Work et al. ...................... 101/91 |
| 2006/0048059 | A1 | 3/2006 | Etkin |
| 2006/0074863 | A1 | 4/2006 | Kishore et al. |
| 2006/0075228 | A1 * | 4/2006 | Black et al. .................... 713/167 |
| 2006/0089857 | A1 * | 4/2006 | Zimmerman et al. ............ 705/2 |
| 2006/0121987 | A1 | 6/2006 | Bortnik et al. |
| 2006/0143067 | A1 | 6/2006 | Calabria |
| 2006/0178910 | A1 * | 8/2006 | Eisenberger et al. ............. 705/3 |
| 2006/0190281 | A1 | 8/2006 | Kott et al. |
| 2006/0195441 | A1 * | 8/2006 | Julia et al. ......................... 707/5 |
| 2006/0238380 | A1 | 10/2006 | Kimchi et al. |

(Continued)

OTHER PUBLICATIONS

'BulletinBoards.com', Privacy Policy—Terms of Use, http://www.bulletinboards.com/TermsOfUse.cfm, Aug. 1, 2003.*

(Continued)

*Primary Examiner* — Darren B Schwartz
(74) *Attorney, Agent, or Firm* — Ogilvie Law Firm

(57) ABSTRACT

A member of an online community has an online identity published in the online community, and owns an offline identity which is not published there. The member manifests consent to a privacy review of an electronic communication involving the member, to help prevent disclosure of the member's offline identity within the online community. The electronic communication is reviewed by a human privacy reviewer and/or by automatically scanning for privacy concern triggers. Review results are provided to the member, who provides an opinion of the review that is then reflected in a summary of the reviewer's online reputation.

21 Claims, 4 Drawing Sheets

(56) References Cited

U.S. PATENT DOCUMENTS

| | | | |
|---|---|---|---|
| 2006/0242558 A1* | 10/2006 | Racovolis et al. | 715/511 |
| 2006/0259957 A1 | 11/2006 | Tam et al. | |
| 2007/0027715 A1* | 2/2007 | Gropper et al. | 705/2 |
| 2007/0038437 A1* | 2/2007 | Brun | 704/9 |
| 2007/0067405 A1* | 3/2007 | Eliovson | 709/206 |
| 2007/0218997 A1* | 9/2007 | Cho | 463/42 |
| 2007/0271336 A1* | 11/2007 | Ramaswamy | 709/204 |
| 2008/0162202 A1* | 7/2008 | Khanna et al. | 705/7 |
| 2008/0172745 A1* | 7/2008 | Reinart et al. | 726/26 |
| 2011/0209168 A1* | 8/2011 | Shusman | 725/13 |

OTHER PUBLICATIONS

Joon Koh et al., "Encouraging Participation in Virtual Communities", Communications of the ACM, Feb. 2007, vol. 50 No. 2, pp. 69-73.
Steven Cherry, "Virtually Private: A new Swedish network helps you hide online", IEEE Spectrum, Dec. 2006, pp. 52 ff.
K.Y. Chan and S.W. Kwok, "Information Seeking Behavior in Peer-to-Peer Networks: An Exploratory Study", www.kc.tsukuba.ac.jp/dlkc/e-proceedings/papers/dlkc04pp40.pdf, 2003.
Norman Makoto Su et al., "A Bosom Buddy Afar Brings a Distant Land Near: Are Bloggers a Global Community?", www.ics.uci.edu/~normsu/papers/Su-Bosom-CT05.pdf, 2005.
"TAS Administration Manual" excerpts, from www.engenio.com on Nov. 20, 2006.
"Share a Beer with a Complete Stranger", from www.liquorsnob.com, Feb. 10, 2006.
"Staying online and staying healthy", from www.mysocialnetwork.net, Sep. 29, 2006.
"Re: [GNU-net developers] question on how to enforce anonymity", from copilotconsulting.com, Apr. 13, 2004.
Pages from www.soulcast.com, Nov. 13, 2006.
"Amidst Growing Internet Privacy Concerns, Online Blog Comunity SoulCast.com One-Ups MySpace and LiveJournal on Privacy", PRWeb, May 24, 2006.
"EFF Fighting to Protect AnonymityOf Video Publishers", from www.podcastingnews.com, Oct. 31, 2006.
"Anonymity Preserved for Online Embroidery Fans", from www.eff.org, Sep. 14, 2006.
"Hot-P2P '06 Program", web-minds.consorzio-cini.it, Apr. 29, 2006.
"Have you ever met anyone from here?", postings from community.channel4.com, Sep. 4, 2006.
"Have you ever met anyone from here?", postings from community.channel4.com, Oct. 13, 2006.
"How to . . . Go Meet someone that you Met online?", postings from forum.literotica.com:81, Oct. 8, 2003.
"Anonymous Communication", exitthematrix.dod.net, no later than Nov. 13, 2006.
"Social Networking using Google Maps mashups", googlemapsmania.blogspot.com, Sep. 1, 2006.
"Category:Social networking", en.wikipedia.org, Nov. 14, 2006.
"Social network", en.wikipedia.org, Nov. 14, 2006.
"Virtual community", en.wikipedia.org, Nov. 14, 2006.
"Meetup.com", en.wikipedia.org, Nov. 11, 2006.
Pages from www.diggwire.com, Nov. 14, 2006.
"The Experience Project", postings from www.asexuality.org, Sep. 14, 2006.
"Tell the World Something about Yourself", pages from www.experienceproject.com, Nov. 14, 2006.
"Welcome to the Experience Project", pages from www.experienceproject.com/learnmore.php, Nov. 14, 2006.
"Experience project is social networking by what you do, not who you know", blog.wired.com, Oct. 6, 2006.

\* cited by examiner

ANONYMOUS SOCIAL NETWORKING WITH COMMUNITY-BASED PRIVACY REVIEWS OBTAINED BY MEMBERS

RELATED APPLICATIONS

The present application incorporates and claims priority to each of the following: U.S. provisional patent application Ser. No. 60/865,757 filed Nov. 14, 2006; U.S. provisional patent application Ser. No. 60/866,418 filed Nov. 18, 2006; and U.S. provisional patent application Ser. No. 60/868,619 filed Dec. 5, 2006.

BACKGROUND

Social network services are provided online for communities of people who share interests. Social network services provide ways for members of an online community to learn about each other, such as directories, profiles, personal pages, and search facilities. Social networks also build on or provide ways for members of an online community to communicate electronically with each other, such as chat, email, instant messaging, blogs, forums, video transmissions, and discussion groups.

Contacts made online through a social network using online identities may be pursued offline. People who first met online may decide to meet in person offline for dating, friendship, business, or philanthropic activities, for example. Even if a member of an online community chooses not to meet other members in person offline, the member's offline identity may become known to others, through a communication from the member or otherwise.

SUMMARY

In connection with some embodiments, a member of an online community has an online identity which is published within the online community, and the member owns an offline identity which is not published within the online community. The member electronically manifests consent to a privacy review of an electronic communication (possibly not yet created) for which the member is a sender and/or an intended receiver. A goal of the privacy review is a lowered risk of disclosure of the member's offline identity within the online community. A service provider obtains the electronic communication and determines that the electronic communication should be submitted to a privacy review to assess the extent to which the electronic communication discloses the member's offline identity. A human privacy reviewer reviews the electronic communication. Results of the review are provided to the member.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
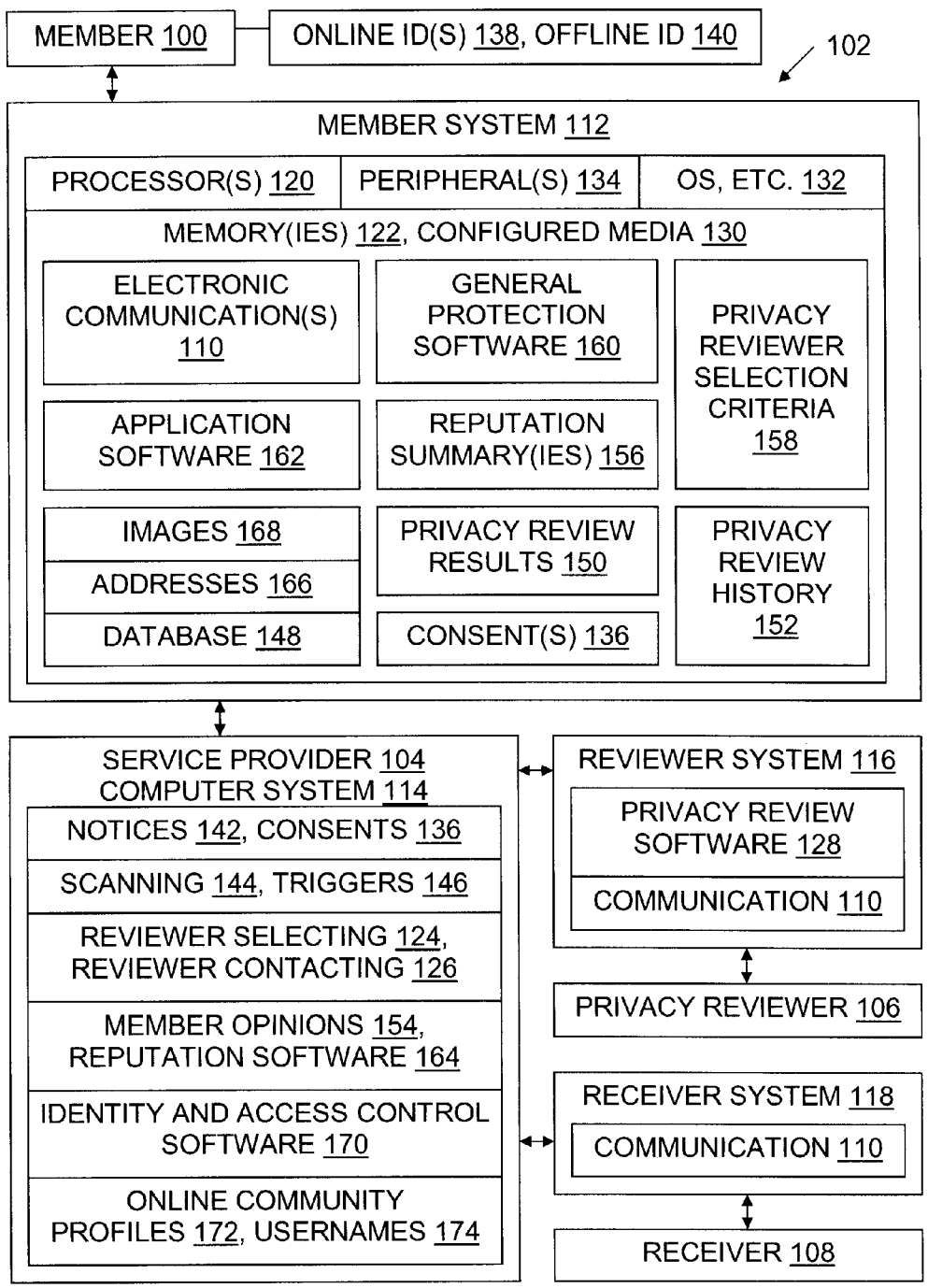
FIG. 1 is a block diagram illustrating an operating environment, some roles, some data structures, and some system and configured storage medium embodiments.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more personal computers (portable or not), servers, personal digital assistants, cell or mobile phones, and/or device(s) having a processor controlled at least in part by instructions. The instructions may be in the form of software in memory and/or specialized circuitry. In particular, although it may occur that many embodiments run on personal computers and/or on servers, other embodiments may run on other computing devices, and any one or more such devices may be part of a given embodiment. Terms such as "computerized" refer to devices having a microprocessor and memory, not merely to personal computers or servers.

"Electronic" refers to digital and/or analog electronic circuitry.

"Automatic" means without requiring ongoing real-time human input or guidance to perform the immediately contemplated operation.

Operating Environment

With reference to FIG. 1, roles within an operating environment for an embodiment may include a member 100 of an online community 102, a service provider 104, a privacy reviewer 106, and an intended receiver 108. In a given configuration, the service provider 104, the privacy reviewer 106, and/or the intended receiver 108 may also be members of the online community. An online community may have more than one service provider, e.g., it may have both an internet service provider (ISP) and an online community services provider (OCSP), with service provider 104 services being provided by either of these or by both the ISP and the OCSP, depending on the configuration. Commercial embodiments may operate on an ad-revenues business model, on a user-fee model (e.g., with anonymous payments), and/or on other business models.

In some configurations, the service provider 104 provides general-purpose services such as email, web page hosting and message forum hosting, which have been adapted by members 100 for uses specific to the online community. In some configurations, the service provider 104 provides services that are specific to the online community, such as profile-editing software. In some configurations, the service provider 104 provides both general-purpose services and specific services to support the online community.

In some configurations, a human person serves as a privacy reviewer 106. In some configurations, the role of privacy reviewer 106 is filled in part or in full by a special-purpose software process that automatically scans electronic communications 110 for specified keywords, specified data types, and/or other specified privacy concern triggers. In some configurations, the role of privacy reviewer is filled by a human person assisted by such special-purpose software.

The intended receiver 108 may be a member of the online community, but need not be a member in every configuration. The intended receiver may also be an actual receiver, that is, an electronic communication 110 intended for the receiver 108 may have been actually delivered to the receiver 108. On the other hand, the intended receiver may be simply someone to whom the member can address an electronic communication 110, and it is not necessary in every configuration for the electronic communication 110 to exist in order for the role of intended receiver to be filled. A member may give consent, for example, to privacy review of all electronic communications 110 made or yet to be made by the member within the online community, thereby placing every current and future member of the online community in the role of intended receiver for electronic communications 110 that have not yet been created.

Because of space limitations, FIG. 1 shows only one member 100, one service provider 104, one privacy reviewer 106, and one intended receiver 108. However, a given configuration may include zero or more members, service providers, privacy reviewers, and receivers, depending on the requirements of the embodiment being discussed. Each of these entities may also belong to or facilitate one or more online communities 102 in a given configuration.

An operating environment for an embodiment may include, for instance, a member computer system 112, a service provider computer system 114, a privacy reviewer computer system 116, and a receiver computer system 118. Each computer system 112-118 has a processor 120 and a memory 122 which operate together to provide functionality discussed herein. But the various computer systems 112-118 need not be identical with each other. For example, the service provider system 114 may include privacy reviewer selection software 124 and/or privacy reviewer contact management software 126 that is not present on the member/sender computer system 112 or on the member/receiver computer system 118. Similarly, the reviewer computer system 116 may include privacy review software 128 that is not present on the other computer systems 112, 114, 118.

Such software 124-128, like other software discussed herein, includes instructions that are executable by a processor 120 and also includes data which is created, modified, referenced, structured, and/or otherwise used by the instructions. The software's instructions and data configure the memory(ies) 122 in which they reside. For example, the software may configure a removable memory device 130 such as a DVD or a flash memory even when that memory device is not plugged into a computer system. The software may also configure a memory 122 that is a functional part of a given computer system, such as RAM or a plugged-in removable memory 130, in which case the software instructions and data also configure the given computer system.

In some configurations, peripheral equipment 134 such as human user I/O devices (screen, keyboard, mouse, microphone, speaker, motion sensor, etc.) will be present in operable communication with the processor 120 and the memory 122. However, a software embodiment may also be deeply embedded, on a service provider server 114 for example, such that the software in the embodiment has no human user interaction through human user I/O devices during normal operation.

In some configurations, networking interface equipment 134 such as a packet-switched network interface card, a wireless transceiver, or a telephone network interface, for example, will be present in a computer system 112-118. However, a computer system may also communicate through direct memory access, removable nonvolatile media, or other information storage-retrieval and/or transmission approaches.

An operating environment for an embodiment may include a single member computer system 112, a single service provider computer system 114, a single privacy reviewer computer system 116 and/or a single receiver computer system 118. A given embodiment may also include two or more computer systems 112-118, which may be linked to one another for networked communication.

Each computer system 112-118 may run any network and operating system software 132, and may use any network interface equipment and other peripheral equipment 134, now known or hereafter formed. The operating environment may include computer systems 112-118 that are client-server networked and/or peer-to-peer networked. Some operating environments include a stand-alone (non-networked) computer system, such as a privacy reviewer computer system 116 configured for use in reviewing electronic communications 110 which are accessed from a removable storage medium 130 such as a magnetic tape.

Systems

In some embodiments, a computer system 112 configured for use by a member 100 of an online community 102 includes a memory 122 configured with computer-executable instructions, and a processor 120, coupled with the memory, that executes instructions. The instructions are part of software with which the member 100 electronically manifests a consent 136 to a privacy review of an electronic communication 110 by a human privacy reviewer 106.

For example, the member may press a user interface button labeled "Yes, I consent" after being shown an appropriate notice on a screen 134, thereby generating a consent 136 in the form of a cookie, a certificate, a bit flag, or another data structure. Privacy review consents 136 manifested on a member computer system 112 may be logged into a database of consents 136 and/or otherwise tracked on a service provider computer system 114 in client-server configurations. In peer-to-peer configurations, consents 136 generated on a member computer system 112 may be transmitted to a peer computer system such as a privacy reviewer computer system 116 and/or a receiver computer system 118.

The electronic communication 110 has not necessarily been created yet when the consent 136 is manifested. The member 100 is confirmed as a sender and/or an intended receiver of the electronic communication 110 after the electronic communication is created. Some examples of electronic communications 110 include an email, an instant message, a blog entry, a blog comment, a forum posting, a video file or stream, and a voip communication.

The member is identified by an online identity 138 in the electronic communication. A goal of the privacy review is a lowered risk of disclosure of an offline identity of 140 the member within the online community 102.

Some examples of online identities 138 are usernames, email addresses, web page addresses, and avatars. Some examples of offline identities 140 are legal names, residential addresses, employer names, and information of the type found on drivers licenses, passports, and other government-issued identification documents.

Space limitations and deference prevent showing every item in FIG. 1 at every possible location of the item. For example, in some embodiments a notice 142 is generated on a service provider computer system 114, as shown, and then transmitted to a member computer system 112, despite the fact that FIG. 1 does not expressly illustrate a notice 142 on the member computer system 112 shown. The content of a given notice 142 may vary, as discussed elsewhere herein. As another example of how FIG. 1 merely helps illustrate possible configurations, each of the computer systems 112-118 has one or more processors 120 and at least one memory 122, even though these two items are shown expressly only for system 112.

A privacy review may decrease in various ways the risk of disclosure of a member's offline identity within the online community. At a basic level, simply knowing that privacy reviews are used routinely, or perhaps even merely knowing that they are an option available to members, may be enough in some cases to reduce disclosure risk because members' knowledge of privacy reviews leads members to proactively draft and review their electronic communications with offline privacy protection in mind. The members check at least some of their communications themselves to look for offline identity information, instead of simply submitting the communications to privacy review by someone else.

At a more advanced level, a member communication 110 undergoes a privacy review beyond whatever personal review was done by the member 100 that wrote the communication. The privacy review may be performed automatically and/or by a human privacy reviewer 106.

Automatic privacy review may be performed by scanning software 144 that scans the communication for specified privacy concern triggers 146. Some examples of possible triggers 146 based on content include: personal names, family names, phone numbers, offline addresses, online addresses, geographic names, landmark names, questions seeking geographic information, statements containing geographic information, questions seeking employment information, statements containing employment information, indications of gender, indications of race, indications of ethnicity, indications of age, indications of title, indications of profession.

Some of these triggers can be readily recognized automatically by searching for keywords. For example, a list of states, provinces, and countries can be searched automatically to check offline addresses. An automatic search can be made for geographic terms like "river", "lake", "mountains", "border" and the like. An automatic search can be made for landmark names like "Eiffel", "Parliament", "National Park" and the like. In some cases, the set of keywords automatically searched may be taken from a database 148. Personal and family names, and employer names, for instance, can be found in numerous searchable public databases.

Some automatic searches may scan for particular data formats. Some example data formats include formats used for addresses 166 or images 168. Some examples of addresses 166 include alphanumeric strings that match telephone number syntax, alphanumeric strings that match email address or website address syntax, alphanumeric/numeric (depending on location) strings that match zip code or other postal code syntax, and so on. Some examples of images 168 include communication 110 files having extensions associated with images (.jpg, .mpeg, .pdf, etc.), inline images in the body of a communication 110, and hyperlinks in a communication to a data stream or website that contains an image; links may be followed and destination pages parsed.

Privacy review may be performed by a human privacy reviewer 106 who controls execution of scanning software 144. In some embodiments, a processor coupled with memory executes instructions for a member 100 to electronically receive a notice 142 that review can be performed by a human privacy reviewer if the member so desires (opt-in approach). In some cases, a notice 142 is given that the human privacy review will be made unless the member chooses otherwise (opt-out approach).

In some cases, a notice 142 is given that the human privacy reviewer belongs to the online community. When privacy reviewers 106 are also members 100 of an online community 102, their reviews may better reflect the standards of that online community. The diligence of privacy reviewers 106 who belong to an online community 102 may also be boosted by their concern for their reputation (even under a username) within that online community.

The human privacy reviewer 106 may use privacy review software 128 for highlighting, annotating and/or editing a communication 110 to point out and/or suggest a change in a part of the communication that the reviewer believes presents a noteworthy risk of offline identity disclosure. Annotated communications, changes, proposed changes, comments, assessments, and/or other privacy review results 150 pertaining to the disclosure risk posed by the communication are provided electronically to the member 100 by email or otherwise.

The privacy review software 128 may also provide a human privacy reviewer 106 with access to a privacy review history 152. The privacy review history 152 may contain information specific to individual privacy reviews, may contain aggregated statistical information based on multiple privacy reviews, or both. It may track items such as particular privacy concern trigger keywords (e.g., "Texas"), particular types of privacy concern triggers (e.g., US state names), particular members (e.g., a member identified to the reviewer only as number 31415926 has not previously sent any communications that triggered a privacy review), particular communications (e.g., this email message was edited to its current form by the originating member after an automatic privacy review found an email address in the message body), privacy reviewers (e.g., communications from this member have been reviewed by seven different human privacy reviewers), and other pertinent information regarding privacy reviews.

In some embodiments, a member 100 has electronic access to a portion of the privacy review history 152, by email, web page access, voicemail, text message, or otherwise. The privacy review history 152 provided to the member may be considered part or all of the privacy review results 150. In addition to suggestions for changing a communication to make it less risky, the privacy review history 152 provided to the member may contain other data. For example, a read-only copy of a privacy review history given to a member could display the relative frequency with which human privacy reviewers as a group have treated a given item as a risk to the privacy of offline identities.

In some embodiments, a processor coupled with memory executes instructions for the member 100 to electronically provide an authority within the online community 102 with an opinion 154 about the privacy review performed by the human privacy reviewer 106. The authority may be the online community services provider 104 or software for which that services provider is responsible, or the authority may be the human privacy reviewer, for example. The opinion may be requested and obtained without disclosing the reviewer's identity (online and/or offline) to the member. Likewise, in connection with privacy review results 150 or otherwise, in some embodiments a processor coupled with memory executes instructions for a member 100 to electronically receive a notice 142 that an identity (online and/or offline) of the member is kept hidden from a human privacy reviewer 106.

The opinion 154 may include a free-form comments section and/or a multiple-choice section, for example. A purpose of the opinion may be to reflect the extent to which the reviewed member (the member whose communication was subject to privacy review) believes that the suggestions and/or changes from the human privacy reviewer 106 actually reduce the risk of disclosure of the reviewed member's offline identity within the online community. Another purpose of the opinion may be to reflect ways in which the reviewed member believes that different edits to the communication would have been better.

Another purpose of the opinion 154 may be to provide a basis for confirming or modifying a privacy reviewer reputation summary 156. In some embodiments a processor coupled with memory executes instructions for a member to electronically receive a reputation summary of the human privacy reviewer, the reputation summary being a response to opinions 154 of online community members about privacy reviews performed by the human privacy reviewer. More generally, reputation software 164 solicits and receives opinions 154 and uses opinions 154 to calculate reputation summaries 156, which the reputation software 164 then makes available for use by members 100 and reviewers 106.

A reputation summary for a given human privacy reviewer may include one or more ratings, based on opinions 154 from reviewed members, indicating for example the speed, helpfulness, clarity, respectfulness, and/or credibility of privacy review results 150 generated by that human privacy reviewer. Comments from reviewed members may be included in some reputation summary embodiments.

Minimum acceptable privacy reviewer ratings may be specified by a member in privacy reviewer selection criteria 158. In addition, or without specifying acceptable ratings, a member may specify other privacy reviewer selection criteria 158, such as a minimum level of experience as a privacy reviewer, (no) previous experience reviewing the member's communications 110, and/or (non)membership in the online community 102 or some identified group therein. In some embodiments, a particular privacy reviewer can be selected by a member, using an online identity of the privacy reviewer.

Some configurations include general protection software 160 such as encryption software, anti-phishing software, firewall software, anti-virus software, anti-adware software, and the like. General protection software may be used to further raise awareness of identity crimes and unwanted imposition on privacy. However, general protection software 160 is not specifically designed to help maintain the privacy of offline identities within an online community as described herein.

Some member systems 112, privacy reviewer systems 116, and/or receiver systems 118 will be configured with application software 162 such as word processors, email and instant messaging programs, and/or other applications that can be used to create, modify, transmit, store, retrieve, and/or otherwise manage electronic communications. However application software 162 is not specifically designed to help maintain the privacy of offline identities within an online community as described herein.

Some service provider systems 114 are configured with identity and access control software 170, which manages online community member profiles 172 and usernames 174. For example, access control software 170 may require a password from a member 100 before allowing the member to read members-only postings or allowing the member to make a change in a profile of the member that is available through the online community.

Some embodiments include a configured computer-readable storage medium 130. In a computer system 112-118, disks (magnetic, optical, or otherwise), RAM, EEPROMS or other ROMs, and/or other configured storage medium can be provided as part of working memory 122, and/or in addition to working memory 122. A general-purpose storage medium, which may be removable or not, and may be volatile or not, is configured with data structures and instructions to thereby form a configured medium which is capable of causing a system with a processor to perform steps and provide functionality disclosed herein.

For example, a system may be configured with data such as privacy review results 150, privacy reviewer reputation summaries 156, privacy review histories 152, privacy reviewer selection criteria 158, and member opinions 154 of privacy reviews.

Also, a system may be configured with instructions capable of performing functions such as selecting a privacy reviewer (e.g., with software 124), contacting a privacy reviewer with pertinent information such as the electronic communication to be reviewed (e.g., with software 126), and generating privacy reviewer reputation summaries (e.g., with software 164).

Configuring a system with such data and/or such instructions creates a special-purpose system which accepts input representing items outside the system, and transforms that input to provide useful and concrete results that help reduce the offline identity disclosure risk. FIG. 1 helps illustrate configured storage media embodiments, as well as system embodiments, process product embodiments, and method embodiments. A configured medium may also be considered an article of manufacture and/or a process product, produced using for example steps shown in FIGS. 2-4.

Some embodiments include a computer system such as system 114 which is configured for use by service provider such as an online community service provider 104 to help maintain the privacy of offline identities 140 of members 100 of an online community 102. The system includes a memory 122 configured with computer-executable instructions. A processor 120 in the system is coupled with the memory and executes the instructions.

For example, in some embodiments the system 114 obtains an electronic communication 110 which involves a member 100 of the online community 102. The member in question is involved in that the member is a sender and/or an intended receiver of the electronic communication. The communication may be obtained, for example, by making a copy in memory after giving appropriate notice to the member 100.

The system 114 determines that the electronic communication 110 should be submitted to a privacy review to assess the extent to which the electronic communication discloses the member's offline identity 140. A determination may be made by scanning for privacy concern triggers, by noting a standing instruction from the user, by noting an alert placed by the service provider 104 or by an authorized privacy reviewer, and/or in some other manner. Some embodiments detail the determination criteria in a notice 142 to the member. Some embodiments indicate the basis of the determination in a privacy review history or a comment attached to the communication.

Not every item shown in FIG. 1 need be present in every system embodiment or in every configured medium embodiment. Although implementation possibilities are illustrated here in text and drawings by specific examples, other embodiments may depart from these examples. For instance, specific features of an example may be omitted, renamed, grouped differently, repeated, instantiated in hardware and/or software differently, or be a mix of features appearing in two or more of the examples.

Methods

Figure 2:
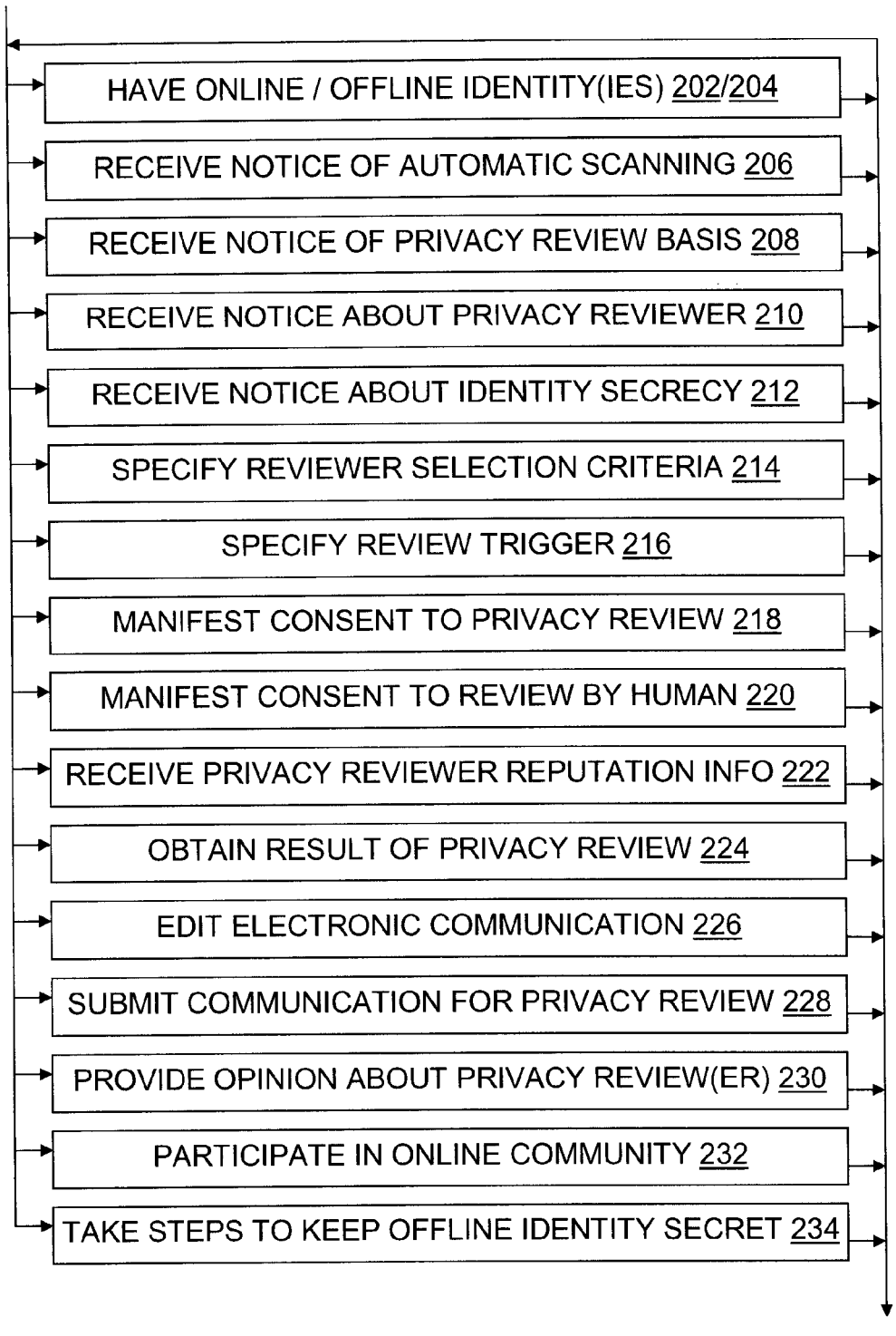
FIG. 2 is a flow chart illustrating steps of some method and configured storage medium embodiments from a point of view of a member of an online community.
Figure 3:
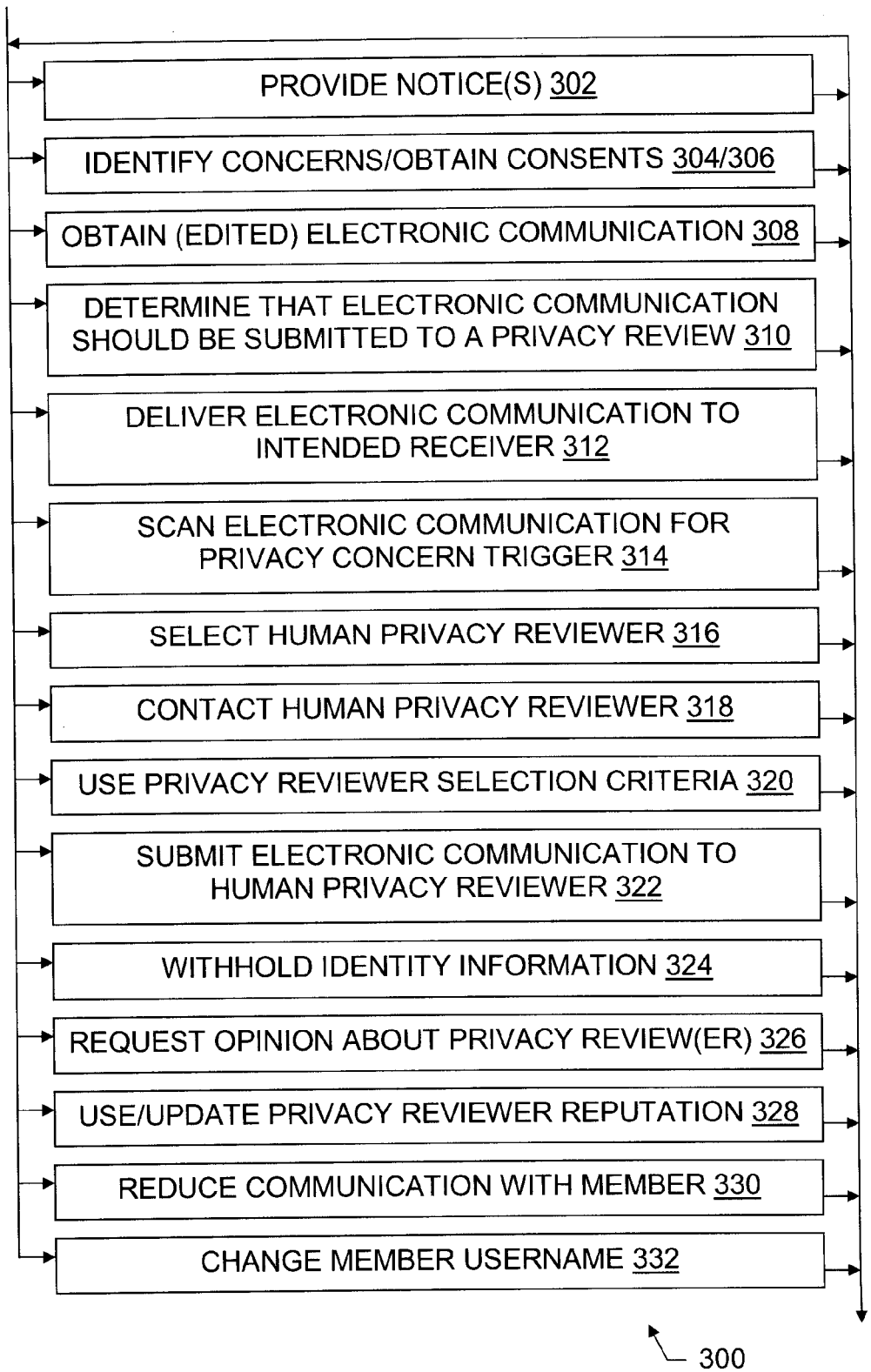
FIG. 3 is a flow chart illustrating steps of some method and configured storage medium embodiments from a point of view of a service provider who facilitates an online community.
Figure 4:
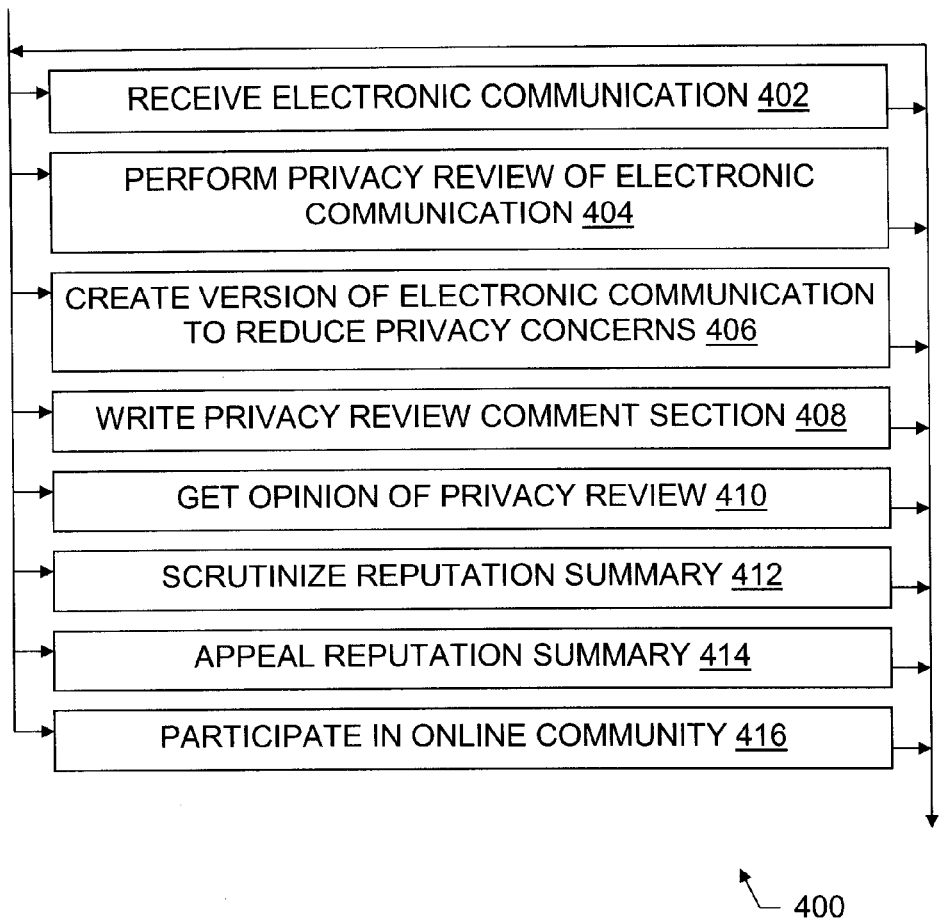
FIG. 4 is a flow chart illustrating steps of some method and configured storage medium embodiments from a point of view of a human privacy reviewer who reviews an electronic communication for an online community.

FIGS. 2-4 illustrate some method embodiments. In a given embodiment zero or more illustrated steps of a method may be repeated, perhaps with different parameters or data to operate on. Steps in an embodiment may also be done in a different order than the top-to-bottom order that is laid out in the Figures. Steps may also be omitted, combined, or otherwise depart from the illustrated flow, provided that the method performed is operable and conforms with at least one claim.

FIG. 2 shows a flow chart 200 illustrating steps of some method and configured storage medium embodiments from a point of view of a member 100 of an online community 102, for example.

Actions by a member discussed herein may equivalently be considered actions by software and hardware for which the member is responsible, e.g., by a system over which the member has control, and vice versa. The same holds true of actions by a service provider, by a human privacy reviewer, or by a human receiver of a communication. That is, a system of hardware and software, a system of hardware, and a system of software, may each be deemed an agent or alter ego of a human who controls that system.

As indicated by steps 202 and 204, the member has one or more online identities 138 and one offline identity 140, respectively. In particular, a member may have 202 an online identity which is published within an online community 102, and may also own 204 an offline identity which is not published within the online community. The member 100 may have online identities 138 in the form of usernames, avatars, personal web pages, and other online data which reflects aspects of the member's activities and preferences.

Online identity is generally under at least partial control of the member, and in many cases is under complete, or nearly complete, control of the member, e.g., by setting profile information and choosing email addresses. Indeed, a member may choose to have more than one online identity within a given online community.

By contrast, the offline identity of a given member can be considered unique. However, this is a definitional preference, not a requirement in every embodiment. One could also define offline identities 140 according to time periods in the member's life, for example, or roles played by the member in the offline worlds, e.g., at home versus at work. Online identities can, however, provide some anonymity which is rarely if ever provided by offline identities.

During one or more notice receiving steps, a member receives electronically a notice 142. A given notice 142 may be triggered by an event such as admission to membership in an online community, creation of an electronic communication 110 by a member, updates sent to the online community membership generally, or receipt of a privacy review result 150 by a particular member. Several notice steps 206-212 are illustrated in FIG. 2; zero or more of these steps and/or other notice steps may be part of a given method.

During an automatic scanning notice receiving step 206, a member 100 receives a notice 142 indicating that a privacy review is based at least in part on automatically scanning an electronic communication 110 before delivery of the electronic communication to an intended receiver. For example, an electronic communication involving the member can be (or in some cases, will be) automatically scanned for privacy concern triggers 146. The notice given may include examples of privacy concern triggers that will be detected automatically.

During a privacy review basis notice receiving step 208, a member 100 receives a notice 142 listing one or more grounds on which a privacy review will be made, automatically and/or by a human privacy reviewer. The notice given may include examples of privacy concern triggers 146, excerpts from privacy reviewer selection criteria 158, and/or excerpts from a privacy review history 152. The notice may also include a statement from a human privacy reviewer 106 explaining the reviewer's goals and approach during privacy reviews.

In particular, a member may electronically receive a notice 142 that a privacy review is based at least in part on scanning an electronic communication 110 for at least one of the following: personal name, family name, phone number, offline address, online address, geographic name, landmark name, a question seeking geographic information, a statement containing geographic information, a question seeking employment information, a statement containing employment information, and/or an indication of gender, race, ethnicity, age, title, or profession.

During an automatic scanning notice receiving step 210, a member 100 receives a notice 142 about a human privacy reviewer 106. The notice given may include an indication of whether the human privacy reviewer is a member of the online community 102 to which the member also belongs, a reputation summary 156 pertaining to the privacy reviewer, and/or any of the information discussed in connection with privacy review basis notice receiving step 208.

During an identity secrecy notice receiving step 212, a member 100 receives a notice 142 about identity secrecy. The notice given may include an indication that the member's offline and/or online identity(ies) will not be disclosed to a human privacy reviewer 106. Likewise, the notice given may include an indication that the human privacy reviewer's offline and/or online identity(ies) will not be disclosed to the member.

During a privacy reviewer selection criteria specifying step 214, a member 100 specifies, through a user interface or by accepting default values, criteria for selecting a human privacy reviewer 106 to perform a privacy review of an electronic communication 110 involving the member. In general, a member consents to a privacy review conditioned on specified privacy reviewer selection criteria 158 being met.

At one extreme, in some embodiments the member may specify that only automatic scanning may be used to perform privacy reviews, in which event no human privacy reviewer meets the selection criteria. In other embodiments and/or other circumstances, the member may specify a particular human privacy reviewer 106, either by that reviewer's username or by selecting a reputation summary 156 of that reviewer in a context that requires or invites selection of a human privacy reviewer.

In some cases, a member electronically specifies 214 at least one geographic region as a privacy reviewer selection criterion, for example. The member electronically manifests consent to privacy review by a human privacy reviewer who resides outside the specified geographic region(s), thereby reducing the chance that the privacy reviewer and the member will ever meet in person offline.

During a privacy review trigger specifying step 216, a member specifies conditions that will trigger a privacy review. For example, triggers may be set such that privacy review may be performed on all outgoing communications 110, on all incoming communications 110, or both. Privacy review may be performed on communications sent by the member to, and/or those received by the member from, specified populations. Whitelists, blacklists, histories, and/or usernames, for example, may be used to define the populations that trigger privacy review. For instance, a member may specify 216 that all communications 110 sent by the member to anyone never previously written to by the member, or who has not written the member in the past six months, or whose username is Fubar, should be subject to privacy review. In general, communications that are subject to privacy review are also subject to possible editing (including cancellation of the communication) by the member before being delivered to the destination(s) chosen by the member.

During a consent manifesting step 218, a member electronically manifests consent to at least one privacy review, to be performed automatically and/or by a human privacy reviewer, of a communication involving the member. When a member electronically manifests a consent 136 to a privacy review of an electronic communication 110, that electronic communication has not necessarily been created yet. The member is a sender and/or an intended receiver of the electronic communication after the electronic communication is created.

In some cases, a stated goal of the privacy review is a lowered risk of disclosure of a member's offline identity within the online community 102. In other cases, goals of a privacy review are not expressly stated in connection with a corresponding consent 136.

Consent to an action, as used herein, includes consent prior to the action, ratification of the action after it was performed, or both. Consent may be manifested during initial registration of a member 100 with an online community, and/or consent may be sought from the member on a communication-by-communication basis when privacy review is triggered automatically, for example. Consent for privacy reviews may not be legally required in every jurisdiction, but consent may be sought nonetheless out of respect for members and as a good business practice. A button press, an email, and/or any other tool used to form a contractual agreement or to obtain permission in other contexts may be adaptable for use in the context of obtaining a member consent 136 to a privacy review.

An appropriate notice 142 may be given to expressly inform a member about the privacy review activity for which consent is being sought. In some cases, for example, the member electronically manifests consent 218 specifying that website addresses and email addresses in electronic communications are subject to privacy review. In some, the member electronically manifests consent specifying that offline addresses in electronic communications are subject to privacy review, and/or specifying that images in electronic communications are subject to privacy review.

During a consent manifesting step 220, a member electronically manifests consent to at least one privacy review to be performed by a human privacy reviewer. Accordingly, consent manifesting step 220 is a special case of consent manifesting step 218, because step 218 contemplates consent to automatic and/or human privacy review. In some cases, the member electronically receives a notice 142 that privacy review includes submission of the electronic communication to a human privacy reviewer if a privacy concern trigger is found by automatic scanning of an electronic communication, and the consent is manifested 220 based on the notice.

During a reputation summary receiving step 222, a member receives electronically (e.g., by email, web page viewing, voicemail, text message, etc.) information from a reputation summary 156 of a privacy reviewer. The privacy reviewer whose reputation is summarized and presented to the member may be a human privacy reviewer or an automatic privacy reviewer.

During a privacy review result obtaining step 224, a member obtains electronically a result 150 of a privacy review of an electronic communication. Privacy review results 150 may include, for example, a copy of a reviewed communication with portions highlighted and annotated to explain privacy risks found in the communication 110 during the review.

As an example, an incoming message and a draft response submitted to privacy review might be annotated as shown below. In this example, which is merely one of many possible different examples, privacy reviewer comments are enclosed in braces { }.

To: Pumpkin Farmer
From: Market Manager
Subject: Great Pumpkins!
Hi! I saw your pumpkin photos on the www waytoomanythingsforsale corn website {RISK: website address named} and got your email address from there. Do you live anywhere near West Smallishton? {RISK: city or town named} I would like to discuss some ways to help you increase your sales. We could meet by the Seven Squash Fountain downtown, Friday evening. I look forward to meeting you! Anxiously awaiting your reply, MM.

From: Pumpkin Farmer
To: Market Manager
Subject: RE: Great Pumpkins!
Sorry, but I only sell pix. My actual pumpkins themselves are not for sale. You might be a nice person, but if you are you should stay away from the Seven Squash Fountain because it has been a dangerous place ever since they built the Flack Pit next door. Sincerely, PF.

In this particular example, only a town and a website were flagged as privacy concerns by hypothetical automatic scanning software 144. In other examples, particularly if a privacy review were performed by a human privacy reviewer 106, an additional risk could be identified in that the first message above asks for information about where the recipient lives. The references to Seven Squash Fountain and to the Flack Pit could also be identified as risky, because the reply message indicates familiarity with those locations and hence discloses offline identity information about the user who is named Pumpkin Farmer. Specifically, Pumpkin Farmer's evident knowledge of the Seven Squash Fountain and the Flack Pit suggests that Pumpkin Farmer lives somewhere in their general vicinity, or at least has visited that vicinity not long ago. Thus, offline identity information about Pumpkin Farmer is at risk of being disclosed.

During an editing step 226, a member edits a communication 110 in response to a privacy review result 150. This may be performed using the same tools 162 (email program, instant messaging program, voice command interface, etc.) that were used to initially create the communication. Risk is generally lowest if the member edits the electronic communication after obtaining the privacy review and before delivery of the electronic communication to any intended receiver, but editing in other circumstance may still be desirable.

As an example, the draft reply from Pumpkin Farmer shown above might be edited in a variety of different ways. An extreme case of editing is complete deletion; the reply could be canceled and never sent to Market Manager. Alternately, the reply could be sent, but without any geographic reference made, e.g., after editing 226 the draft reply to delete the sentence that refers to Seven Squash Fountain and the Flack Pit.

During a communication submitting step 228, a member submits a communication 110 to a privacy review. In some cases a member edits 226 an electronic communication 110 after obtaining the privacy review results 150 and then electronically submits 228 the edited electronic communication 110 for privacy review. In some cases, the submission 228 occurs without a previous privacy review. In some cases, a privacy review has been done, but no edits 226 were made before a re-submission 228 of the unchanged communication 110 because the member accepts the risks of identity disclosure posed by the communication and/or because the member disagrees with the privacy review's assessment of disclosure risks.

Submission 228 (including resubmission) may be done by expressly asking for a privacy review of a given communication 110, or by expressly consenting to a dialog box that asks whether a privacy review can be done on the communication in question. Submitting a communication for privacy review may also be implicit in submitting it to communications transmittal software in an online community. That is, asking a service provider 104 to send a communication 110 may include, based on a prior consent 136, an inherent request that the communication also be submitted 228 to a privacy review and that review results 150 and an opportunity to edit 226 the communication be given to the member who wrote the communication before any version of the communication is actually delivered to the intended receiver.

During an opinion providing step 230, a member 100 provides an opinion 154 about a privacy review result 150 and/or about a privacy reviewer 106. The opinion 154 may be in the form of an email, a survey response, a dialog box response, or another electronic form, for example.

During a participating step 232, a member participates in an online community 102 by submitting electronic posts, sending/receiving other electronic communications, and so on. For example, a social network 102 may be organized into groups based on shared interest in a given topic and/or based on questions of the form "Looking for advice on _____" or "Has anyone ever _____?". Participation 232 is limited to members of the online community 102.

During an identity secrecy protecting step 234, a member 100 takes steps to keep secret the member's offline identity. For example, the member may submit 228 for a privacy review communications that involve the member, may seek or otherwise consent 218 to privacy review, may select a username that does not share any semantic content with the member's offline name, may scrutinize steps taken by the online community to protect member offline identities, and so on.

Some of the steps shown in FIG. 2 may be performed during registration of new members, or even earlier during marketing of an online community 102. Some examples include steps such as receiving 206-212 a notice, manifesting 218,220 a consent, owning 204 an offline identity, ratifying data, and so on. The term "member" as used herein with respect to such steps should be understood to include not only current members 100 of an online community 102 but also prospective members 100 who express interest in joining the online community 102, and in-process-of-registration members 100 who are in the process of joining the online community 102.

FIG. 3 shows a flow chart 300 illustrating steps of some method and configured storage medium embodiments from a point of view of a service provider who facilitates an online community. Methods illustrated in FIG. 3 may help service providers 104 and others maintain the privacy of offline identities of members of an online community.

During a notice providing step 302, a service provider 104 provides one or more notices 142 to one or more members 100 of an online community that is being served by the service provider. Notice providing step 302 in FIG. 3 corresponds generally to notice receiving steps 206-212 and other notice receiving steps not detailed in FIG. 1, except that notice providing step 302 is performed by a service provider whereas notice receiving steps are performed by a member.

During a concerns identifying step 304, a service provider 104 identifies one or more privacy concern triggers 146. The privacy concern triggers may be set using values specified 216 by one or more members 100 and/or by using additional or alternate values. The privacy concern triggers may be identified expressly by listing them and/or they may be identified implicitly by identifying a database 148 which lists them, such as a database of personal names, place names, email addresses, domain names, business names, and so on. Although a database 148 is shown on a member computer system 112 in FIG. 1, the database(s) used to identify privacy concern triggers may reside anywhere they are accessible to the scanning software 144.

During a consent obtaining step 306, a service provider 104 obtains at least one consent from at least one member for at least one privacy review of at least one electronic communication 110. Consent obtaining step 306 corresponds generally to consent manifesting steps 218, 220, except that consent obtaining step 306 is performed by a service provider whereas consent manifesting steps 218, 220 are performed by a member.

During a communication obtaining step 308, a service provider 104 obtains at least one electronic communication 110 involving at least one member 100. As indicated in FIG. 3, the electronic communication 110 may have been edited 226 in response to a privacy review result 150. In some cases, a system 114 obtains 308 an electronic communication before that communication has been received by at least one intended receiver 108 of the electronic communication; in some cases, the communication is obtained 308 before it has been received by any of several intended receivers. Communication obtaining step 308 corresponds generally to communication submitting step 228, except that communication obtaining step 308 is performed by a service provider whereas communication submitting step 228 is performed by a member.

During a determining step 310, a service provider 104 determines that an electronic communication 110 should be submitted to a privacy review. The privacy review may be done to assess the extent to which the electronic communication discloses or seeks disclosure of a member's offline identity. For a given communication 110, this determination 310 may correspond generally to a consent manifesting step 218, for example, if all communications meeting specified criteria (e.g., all outgoing emails) are subject to privacy review and the communication 110 in question satisfies the specified criteria. Alternately, or in addition, a system may determine 310 that a communication 110 is subject to a privacy review if the communication 110 is randomly selected, e.g., under a spot-checking approach. Alternately, or in addition, a system may determine 310 that a communication 110 is subject to a privacy review if automatic scanning of the communication 110 identifies a specified set of one or more privacy concern triggers 146 in the communication 110.

During a delivering step 312, a service provider 104 delivers an electronic communication 110 to an intended receiver 108. For example, an email may be placed in the receiver's in-box, a web page may be displayed on the receiver's screen, or a voicemail or text message may be placed in memory and the receiver notified that a message is waiting to be heard or seen. An instance of delivering step 312 may occur regardless of a privacy review or lack thereof, and regardless of editing or lack thereof in response to a privacy review.

During a scanning step 314, software and/or hardware 144 under the custody or control of a service provider 104 automatically scans an electronic communication to detect one or more privacy concern triggers 146. In some systems, a processor 120 coupled with memory 122 executes instructions for automatically scanning 314 an electronic communication 110 to detect whether the communication contains any of the following privacy concern triggers 146: personal name, family name, phone number, offline address 166, online address 166, geographic name, landmark name, indication of gender, indication of race, indication of ethnicity, indication of age, title, profession, an image 168, a link to an image 168.

As with other steps discussed herein, results of this scanning step configure a memory 122 and may subsequently influence the execution of other steps. For instance, scanning results may be sent to a member 100 in a notice of privacy review basis or as part of privacy review results.

During a human privacy reviewer selecting step 316, a service provider 104 selects a human privacy reviewer 106 to perform a privacy review of an electronic communication 110. In some systems, a processor 120 coupled with memory 122 executes instructions for automatically selecting a human privacy reviewer 106 to perform a privacy review of the electronic communication 110. In some cases, the selecting step 316 selects a human privacy reviewer from among members of the online community 102.

Selection 316 may be random, round-robin, or according to some other approach within a pool of available human privacy reviewers. In some embodiments candidates may be placed in the pool only if they meet privacy reviewer selection criteria 158 specified by a member who is involved with the communication, e.g., as the creator of the communication. For example, privacy reviewer selection criteria 158 provided by the member may include one or more of the following: a geographic criterion pertaining to human privacy reviewer offline geographic location, a profile criterion pertaining to human privacy reviewer online profile content, an activity criterion pertaining to human privacy reviewer online activity.

In some cases, the selecting step 316 selects the human privacy reviewer 106 based at least in part on instances in which the human privacy reviewer has previously reviewed an electronic communication 110 (whether it be the communication presently in question, or another communication) that involves the member.

In some cases, the selecting step 316 selects the human privacy reviewer 106 based at least in part on a reputation summary 156 of the human privacy reviewer, the reputation summary being a response to opinions 154 of online community members about privacy reviews performed by the human privacy reviewer 106.

During a human privacy reviewer contacting step 318, a service provider 104 contacts a human privacy reviewer 106, e.g., by sending the privacy reviewer a copy of an electronic communication 110 to be privacy reviewed, or by a message asking whether the privacy reviewer is available to perform a privacy review. Contact with the reviewer 106 may be made through email, voicemail, text message, instant message, or other electronic communication. In some systems 114, a processor 120 coupled with memory 122 executes instructions for automatically contacting 318 a human privacy reviewer 106 to request a privacy review of an electronic communication 110 by the human privacy reviewer.

During a reviewer selection criteria using step 320, a service provider 104 uses privacy reviewer selection criteria 158. Such criteria may be used, for example, when determining 310 whether a communication 110 should be submitted for a privacy review, or when selecting 316 a human privacy reviewer. Use of privacy reviewer selection criteria 158 as examples may also be made when documenting or otherwise describing privacy protection services and related aspects such as notices 142, consents 136, privacy concern triggers 146, member opinions 154, privacy reviewer reputation summaries 156, privacy review results 150, and privacy review histories 152.

During a communication submitting step 322, a service provider 104 submits an electronic communication 110 to a human privacy reviewer for a privacy review. The entire body of the communication 110 may be submitted 322. In some cases a smaller portion of the communication may be submitted, e.g., any sentence containing a trigger found by automatic scanning 314 could be submitted 322 without giving the reviewer 106 the rest of the communication 110.

During an identity withholding step 324, a service provider 104 withholds identity information. For example, the service provider 104 may withhold 324 online identity information 138 of the member 100 whose communication 110 is being reviewed from the human privacy reviewer 106, may withhold offline identity information 140 of the member 100 from the human privacy reviewer 106, may withhold online identity information 138 of the human privacy reviewer 106 from the member 100, and/or may withhold offline identity information 140 of the human privacy reviewer 106 from the member 100. Withholding 324 information may be implemented in some cases by not supplying the information. Withholding 324 information may also include securing the information by file system access controls, password requirements, encryption, separate storage requiring physical action by a human for access, and/or other security tools and techniques.

During an opinion requesting step 326, a service provider 104 electronically requests from a member 100 an opinion 154 about a particular privacy review, about a set of privacy reviews, about a particular privacy reviewer (human or automated), and/or about a set of privacy reviewers. Opinion requesting step 326 corresponds generally to opinion providing step 230, except that opinion requesting step 326 is performed by a service provider whereas opinion providing step 230 is performed by a member.

During a using/updating step 328, a service provider 104 electronically updates and/or otherwise uses a privacy reviewer reputation summary 156. For example, the service provider 104 may update the reputation summary in response to an opinion 154 received from a member 100; may display the reputation summary to a member 100 or to a human privacy reviewer 106; or may compare the reputation summary to privacy reviewer selection criteria 158.

During a communication reducing step 330, a service provider 104 electronically reduces access to communication with a member 100 in an online community 102. Reduction may be done at least partially in response to repeated determinations 310 that electronic communications 110 which involve the member 100 in question should be submitted to a privacy review. Reduction may also be done in response to an express request by the member 100, e.g., the member may request automatic filtering out of any privacy concern triggers 146 detected by scanning software 144. Reduction 330 may reduce deliverable communication 110 content and/or reduce the set of persons involved in a delivered communication as sender or receiver. Eliminating communication is within the scope of reducing it.

During a username changing step 332, a service provider 104 electronically changes a username of a member 100 in an online community 102. The new username may be automatically sent to some but not all of the persons with whom the member 100 has previously communicated electronically, with the exception, for example, of persons who have previously requested offline identity information 140 from the member in scanned 314 and/or human privacy reviewer-reviewed communications 110. The username may be changed 332 at least partially in response to repeated determinations 310 that electronic communications which involve the member should be submitted to a privacy review.

FIG. 4 shows a flow chart 400 illustrating steps of some method and configured storage medium embodiments from a point of view of a human privacy reviewer who reviews an electronic communication for an online community.

During an electronic communication receiving step 402, a human privacy reviewer 106 receives an electronic communication 110 to be reviewed for risks of offline identity privacy disclosure. The points of view differ, but electronic communication receiving step 402 corresponds generally with electronic communication submitting steps 228 and 322.

During a privacy review performing step 404, a human privacy reviewer 106 performs a privacy review of an electronic communication 110. A privacy review may include scanning the electronic communication for privacy concern triggers specified by the privacy reviewer and/or by others, using privacy review software 128. Additionally, or instead, a privacy review may include reading the electronic communication 110 and bringing to bear on its content as understood by the reviewer 106 the reviewer's knowledge of natural languages, human culture, and human behavior, to identify privacy concerns while guided by a desire to reduce or prevent disclosure of offline identity information 140.

During a reduced concern version creating step 406, a human privacy reviewer 106 creates a version of an electronic communication 110 designed to reduce concerns of offline identity disclosure. The reduced concern version created 406 may be an annotated, redacted, and/or otherwise edited version of the electronic communication 110 in question. The reduced concern version may be created 406 using a word processor, macros that search for and highlight privacy concern triggers, comparison software such as diff, and/or other privacy review software 128. The reduced concern version may be subsequently obtained 224 as privacy review results 150 by the member 100 whose electronic communication 110 was used as a basis for the reduced concern version.

During a privacy review comment writing step 408, a human privacy reviewer 106 writes comments directed toward a member 100 whose electronic communication 110 is being privacy reviewed. The comments may explain specific suggestions or edits made 406 by the human privacy reviewer 106. The comments may be concatenated onto, embedded within, or otherwise associated with the electronic communication 110 being discussed by the comments, and may be subsequently obtained 224 as privacy review results 150 by the member 100 whose electronic communication 110 is being privacy reviewed.

During an opinion getting step 410, a human privacy reviewer 106 gets an opinion 154 from a member 100 regarding a privacy review performed by the privacy reviewer 106 and/or regarding the privacy reviewer 106. The points of view differ, but opinion getting step 410 corresponds generally with opinion requesting step 326 and opinion providing step 230, except that in some embodiments human privacy reviewers do not get individual opinions but instead see only reputation summaries 156 that are based on multiple opinions.

During a reputation scrutinizing step 412, a human privacy reviewer 106 scrutinizes a reputation summary 156. Scrutinizing opinions 154 and/or reputation summaries 156 may help human privacy reviewers 106 gain better understanding of how their privacy review efforts are perceived by reviewed members 100.

During a reputation appealing step 414, a human privacy reviewer 106 appeals to a service provider 104 seeking correction or clarification of some aspect of a reputation summary 156. An appeal process may be supported by privacy review software 128.

During a participating step 416, a human privacy reviewer 106 participates in an online community 102 as a member 100 of that online community; this corresponds with step 232. Human privacy reviewers 106 may or may not be members of online communities for which they perform 404 privacy reviews.

Additional Examples

Some possible embodiments provide new social networking tools and techniques, and in particular, new tools and techniques for facilitating social networks in which members meet online but face little or no risk of ever meeting offline. Some of these possible embodiments include features beyond the privacy review features discussed above. Privacy review features and other features are discussed below in connection with various "embodiments" but it will be understood that a claim defines what actually constitutes an embodiment of that claim, so features discussed in examples should not necessarily be read into a given claim.

Some embodiments may help encourage and support online communities which have an ethos of members providing other members with anonymous help based on candid disclosure of opinions and social facts online, with little risk that the disclosures will lead to unwanted or complicated offline interaction. Embodiments may operate online communities through websites under domains containing marks such as "NeverMeet", "NoFaces", "FriendlyStrangers", "SmallWorld", or the like, depending on the legal availability of such domains and marks.

Some approaches described herein run counter to an assumption that social networking sites should help people meet each other in person. Instead, some embodiments take the approach that an online version of a "strangers in a bar" conversation can be worthwhile. People may be more candid in seeking—and giving—life advice, for instance, if they know they'll never meet in person. Other interactions may also be less inhibited. It may also be helpful for conventional matchmaking sites to offer subscribers a practice forum in which they converse with people whose actual identity they will almost certainly never learn, who will almost certainly never learn their identity, and whom they will almost certainly never meet in person (intentionally or even by accident).

In some embodiments, social network member geographic locations are obtained or approximated, and that geographic information is used to limit online interaction in order to reduce the risk that members who interact online will meet (accidentally and/or intentionally) offline.

For example, in some embodiments, a member can specify one or more geographic areas to be avoided by the system when the system is determining which other members should be able to contact this member. In one simple case, a member who lives in city F can tell the system to avoid allowing that member contact with other members who also live in F. Depending on the implementation, the territories to avoid may be landmarks (Eiffel Tower, . . . ), cities, counties, provinces, states, regions, nations, and/or continents, for instance. A time zone is another example of a geographic region. Territories may be predefined, and accessed through a menu.

In some embodiments, a social networking system may help reduce or prevent online contact between members whose avoidance areas overlap. Thus, if member A says to avoid areas X, Y, Z, and member B says to avoid areas R, S, X, and member C says to avoid areas R, S, T, and member D says to avoid area W, then the social network operates to reduce or eliminate/prevent online interaction (within the social network's virtual community(ies)) between A and B, and between B and C, and it operates to allow (or even encourage) online interaction between A and C, A and D, and B and D. As another example, if Bob lives in California and travels (or plans to travel) to Canada, and Pat lives in Oregon and does not travel, then Bob could list avoidance areas California and Canada, and Pat could list avoidance area Oregon. The system would then allow (or encourage) online interaction between Bob and Pat, because—based on the avoidance areas they specified—there is little risk they will ever be in the same geographic area, and hence little risk they will ever meet offline. By contrast, if Pat listed California in addition to listing Oregon, then the system would take steps to limit or prevent online interaction between Pat and Bob, because their avoidance areas (a.k.a., their personal territories, or their safety zones) overlap.

Some embodiments require that a member specify at least N personal territories, and/or that the member specify a combination of personal territories that satisfies some geographic size requirement. For instance, a member might be required in one implementation to specify at least three personal territories, or to specify at least two territories which are each at least the size of Switzerland, or which meet some minimum combined population total, e.g., territories containing at least 50 million people.

In some embodiments, virtual community cultural pressure, community website contractual terms of use, and/or other similar tools are used to encourage or legally require members to specify a personal territory that includes their current residence. In some embodiments, as an alternative or in addition, tools such as geolocation software or correlation with a payment database are used to identify the apparent approximate geographic location of the computer or other device being used by a member to access the online community, and that geographic region is included (visibly to the member in some cases, invisibly in others) among the member's personal territories. In some embodiments, a member's list of personal territories is private to the member—it is used by the system internally, but is not made visible to other members.

A geographic territory normally is a characteristic of a member, at least as to the geographic territory in which the member resides. But other criteria need not apply to the member who specifies them as avoidance criteria. A member can ask to avoid communication with members who have a particular profession, for instance, without also being a member of that profession.

In some embodiments, a member can specify avoidance criteria that are not geographic in addition to, or instead of, specifying the geographic territories to avoid. For example, a physician who is an expert in some medical field may tell the system to help her avoid communications online with other physicians generally, or perhaps only with other physicians in her medical field. Another physician may similarly tell the system to avoid communications with attorneys. More generally, avoidance criteria may be any of a wide variety of criteria, e.g., geographic location, profession, certain topics of discussion, and so on. Avoidance criteria may be specified in a profile.

The avoidance criteria may have an effect in a system in various ways, depending on the system embodiment.

First, when the system is making or offering a random or semi-random (e.g., based on shared interest in a topic) introduction between two members, it may operate to avoid introducing two members whose personal territories overlap.

Second, when the system is selecting a privacy quality control reviewer 106 of a communication 110, it may operate to avoid selecting 316 a reviewer whose territory overlaps with either the source member 100 of the communication 110 or the intended destination member 100 of the communication 110.

Third, when the system is preparing to display a blog posting, forum posting, comment, or other quasi-public posting by one member, it may limit what is seen by other member(s) so that the posting is not seen by member(s) whose personal territory(ies) overlap the personal territory of the poster. As a result, not every member who looks at (or tries to look at) a blog at a given point in time will necessarily see the same content as the other member(s). Rather, postings may be filtered to prevent viewing by members whose personal territories overlap those of the original poster and/or those of a subsequent commenter. In some implementations, overlap between a potential viewer's territory and any poster's (original, later commenter) territory makes the entire blog (comments and all) unavailable to the potential viewer. In other implementations, redactions are made based on individual's territories, so that the potential viewer sees at least some of the blog but does not see portions posted by members whose territory overlaps the viewer's territory. More generally, a system may filter access to postings to satisfy member avoidance criteria, geographic or otherwise, to reduce the risk that members who communicate online might meet offline.

Some embodiments do not ask members for personally identifying information 140 when they register to obtain a username 174. Other embodiments do ask, e.g., to receive a one-time registration fee, but do not correlate usernames 174 to that personal information 140.

In some embodiments, at least some social network member communications 110 are reviewed 404 for potential disclosure of personally identifying information 140, and review results 150 are used to discourage and/or limit online communications 110 that apparently increase the risk that members 100 who interact 232 online will meet (accidentally and/or intentionally) offline. Such privacy reviews 404 may be automated 314, by people 106, or both.

For example, in some embodiments, member communications 110 (posting, email, IM, chat, etc.) are scanned 314 for key words and phrases 146 that may indicate increased risk of disclosing a member's offline identity 140; online, usernames not reminiscent of offline names etc. are used to identify members. Such privacy concern triggers 146 may include, e.g., personal or family names, phone numbers, addresses (postal, email, web), account numbers, gender, race, ethnicity, age, title, profession, geographic names, landmark names, employer names, phrases such as "where do you live?", "I live in . . . ", "How old are you?", "What school do you go to?", etc.

Various steps may be taken when scanning 314 detects such a privacy concern trigger 146. The communication sender 100 may be told 224, and given a chance to edit 226 the communication 110 before it is sent to any other member 108. The communication may be sent 322 to a randomly selected 316 (or an expertise-and-trust-proven-selected 316) member who serves as a privacy quality control reviewer 106. The trigger 146 may be modified (for learning, eg., as spam detectors learn, but to detect privacy concerns better, not to detect spam). The communication 110 may be sent to its intended member destination(s) 108, with or without some modification 226 by the sender 100 and/or by the system 114 to enhance sender privacy.

In some embodiments, a privacy quality control reviewer 106 receives a communication 110 snippet without receiving any indication who 100 is sending it, reviews 404 it, and makes a judgment about whether it reveals personally offline-identity-revealing information 140. Reviewer comments 150 are sent back to the sender 100. The sender may make changes 226, after which the edited communication 110 is sent to another randomly selected 316 (but again with non-overlapping personal territory) privacy quality control reviewer 106, and so on. Thus, the community 102 helps protect the privacy of its members 100. Individual members may build up, over time, expertise in judging the risk of disclosure, and that expertise may in turn be rated 230 anonymously by the members 100 whose communications 110 are reviewed 404.

Members 106 who prove to be expert and trustworthy at assessing privacy disclosure risks—as judged 230 by those 100 whose privacy they seek to protect—may be rewarded in ways that do not risk disclosure of their own privacy. For example, reviewers 106 may take pride in private recognition 156 by the system of their relative rank among all privacy reviewers 106. Reviewers 106 may enjoy being trusted 402 with review of messages 110 which are more likely than other reviewed messages to disclose a member's offline identity 140.

In some embodiments no privacy reviewer 106 is sent 322 more than some small predetermined number of communications 110 from a given member 100 to review 404. For example, a reviewer 106 might be sent no more than five communications 110 over the course of one year from a given member 100.

In some embodiments, a system goal is to strike a balance that favors online interaction 232 without unacceptable risk of disclosing offline identities 140. In some embodiments, the system cannot prevent intentional disclosure of a member's offline identity 140 by that member 100. But it can often prevent, or at least reduce, the risk of accidental disclosure of a member's offline identity 140 by that member 100.

In some embodiments, social network member computing characteristics are reviewed for potential disclosure of offline geographic location or offline identity revealing information. Computing characteristics may then be hidden and/or altered to reduce or eliminate the risk that members who interact online will meet (accidentally and/or intentionally) offline. Familiar technical means of promoting anonymity by hiding and/or altering computing characteristics can be used, such as not tracking IP addresses (except possibly to initially assign a personal territory as discussed herein), using anonymizing servers or proxies, and so on.

Usernames can be compared to lists of personal and family names, cities, etc., to reduce the risk that a username containing those or other privacy concern triggers will be accepted for use in the system. Dictionary search tools used to find passwords, for instance, could be adapted for use in scanning usernames for personal names, cities, family names, professions, etc.

In some embodiments, posting or other communication of pictures (jpg, gif, tiff, pdf, etc.) is not supported by the system. In other embodiments, pictures 168 may be allowed, but every picture is subject to privacy quality control review 404. For example, cartoon images, avatars, animations, and other images that do not readily reveal the type of identifying characteristics 140 shown in an identification photograph may be allowed.

In some embodiments, links to outside websites are not supported by the system. In other embodiments, links may be allowed, but every link is subject to privacy quality control review 404. At least some disguised links, such as "goo g le dot co m" (note spacing, use of "dot"), may be detected and treated as links.

In some embodiments, each user has two usernames. One (internal username) is seen by the user, while the other (external username) is seen by other people in the system. Messages can be scanned automatically for either type of username; internal usernames in particular can be privacy concern triggers. The user does not necessarily know its own external username; in some embodiments, external usernames are kept secret from their users. Postings of a user which include the user's external username are modified to show the user's internal username instead, at least when the user is logged on. Another person logging on nearby, e.g., a friend of the user, should not see those messages anyway, since the friends' personal territories will overlap. Likewise, if the user logs in under a different account, but is still in the same territory, the original account's messages should be filtered out and thus not displayed to the user.

In some embodiments, the external username associated with a given internal username (via a table or other data structure) is changed on occasion. The user is not normally notified that a change in external username has occurred, but may infer such a change from a loss of contact with some other user that occurs when the old username is disabled. An external username may be changed 332 or otherwise disabled (e.g., user 100 evicted from system) on a regular schedule, e.g., every month, on a randomized schedule, in response to a request from the user 100 ("I'm uncomfortable—please move me to a new virtual bar with a fresh face and new people to meet online"), and/or in response to heightened risk of privacy loss as indicated 310 by automated review of messages to/from the user for privacy concern triggers 146 and/or by actions by privacy quality control reviewers 106 (especially if the system notes a history 152 of privacy concerns). The new external username 174 normally bears little or no resemblance to the previous external username.

In some embodiments, a given internal username is associated with more than one external username, e.g., a different external username may be used in each of several different countries or other territories. This may reduce the risk that when users A and B communicate, A, and C communicate, and B and C communicate, that B and C will together learn more than desired about A's identity. B and C will know A under different external usernames of A, and hence be less likely to correlate information about A.

It will be apparent that preserving one's anonymity is a way to help reduce the risk that one will never meet in person offline someone that one has met online. But it is not the only way. Embodiments can also help prevent unwanted offline meetings by limiting online interaction to members whose personal territories (as stated by the members and/or determined automatically by the system from geolocation) do not overlap.

Traditional profile elements, which contain personally identifying information such as age, gender, race, profession, and geographic location, will likely be used rarely if at all in some embodiments. However, topics of interest might be specified in a profile that is accessible to other members (at least, to those whose personal territories do not overlap your own).

Tools and techniques presented herein may be embodied in various ways, e.g., processes and/or hardware on a server computer, on a client or peer, or on a standalone computer, software (data instructions) in RAM or permanent storage for performing a process, general purpose computer hardware configured by software, special-purpose computer hardware, data produced by a process, and so on. Computers, PDAs, cell phones, and any device having user interface and some network transmission capabilities may be part of a given embodiment. Touch screens, keyboards, other buttons, levers, microphones, speakers, light pens, sensors, scanners, and other I/O devices may be configured to facilitate or perform operations to achieve the methods and systems, and method results, which are described here. Combinations of these may also form a given embodiment.

In view of the foregoing, it will be understood that the present disclosure describes features which can be used independently of one another in embodiments that focus on different approaches. Many features described here could be provided in a given commercial product or services package, but may nonetheless be patentably distinct. Determinations of patentable distinctness are made after a disclosure is filed, and are made by patent examination authorities.

It may be helpful, however, to note here that one of the various ways in which features disclosed herein can be grouped is according to which entity acts. Some steps are unique to a role. A member 100 does steps that are not done by a service provider 104, by a human privacy reviewer 106, or by a receiver 108, for example. The same is true of each of the roles; a service provider 104 does steps not done in any of the other three roles, and so does a human privacy reviewer 106, and so does a receiver 108.

It may also be helpful to note that another way to group features disclosed herein is according to the steps/structures employed.

For example, some embodiments employ avoidance criteria and/or take steps to limit offline interaction based on information from online community members about their offline identity. Thus, some embodiments include accepting an avoidance criterion from a member (current or prospective) of a social network; and limiting (reducing and/or preventing between those with overlapping avoidance criteria, and/or favoring and/or requiring between those with non-overlapping avoidance criteria) online interaction between the member and at least one other member of the social network based at least in part on the members' avoidance criteria. In some, the social network accepts avoidance criteria including a list of personal territories from the member, and limits online interaction based on the personal territories of the members.

As another example, some embodiments employ privacy concern trigger and/or take steps to alert online community members when their offline identity information might be disclosed by a communication. Thus, some embodiments include automatically scanning a communication from a member (current or prospective) of a social network for at least one privacy concern trigger; and submitting the communication to a privacy quality control reviewer after finding at least one privacy concern trigger. In some, the privacy quality control reviewer anonymously reviews the communication and indicates an extent to which the reviewer has concluded that the communication is likely to disclose offline identity information of the member.

As another example, some embodiments employ username mapping and/or take steps to hide/change usernames to make an online community member's online identity a moving target or otherwise difficult to permanently pin down. Thus, some embodiments include accepting a user-visible (internal) username from a user of a website, phone, PDA, or other networked service; and displaying a different username (external) username for that same user to other users of the service. Some also include dynamically changing the external username while maintaining the associated internal username; the change may be on an automated schedule, and/or at specific request of the user, and/or in response to some indication (detected automatically or manually) that the privacy of the user may be compromised or near compromise.

As another example, some embodiments provide privacy protection through username restrictions that limit username content to reduce or avoid use of offline identity information in usernames.

Features disclosed herein may also be categorizable into patentably distinct embodiments in other ways. Regardless, we now turn to more detailed examples of ways in which features may be organized.

In the following examples particular attention is paid to anonymous social networking with community-based privacy reviews, from a reviewed person's perspective.

Some embodiments include a method for use by a first person belonging to an online community, the first person having an online identity published within the online community, the first person also having an offline identity which the first person has asserted should not be published in the online community, the method including the first person: consenting to a privacy review of a communication between the first person and a second person who also belongs to the online community; and receiving a result of the privacy review, the result indicating the extent to which the communication was considered to pose a risk of disclosing at least part of the first person's offline identity in the online community.

In some cases, the first person receives notice that the privacy review is based at least in part on scanning communications before they are delivered to their identified destination(s) in the online community.

In some cases, the first person receives notice that the privacy review is based at least in part on manually and/or automatically scanning communications for at least one of the following: personal name, family name, phone number, offline address, online address, geographic name, landmark name, questions seeking geographic information, statements containing geographic information, questions seeking employment information, statements containing employment information, gender, race, ethnicity, age, title, profession.

In some cases, the first person consents to privacy review of the communication by a third person who also belongs to the online community, and the third person has an offline identity which is not disclosed to the first person. In some cases, the first person consents to privacy review of the communication by a third person, and the method further includes the first person providing an opinion about the third person's privacy review. In some cases, the first person consents to privacy review of the communication by a third person, and the method further includes the first person receiving a reputation summary indicative of the third person's reputation for privacy reviews, based on multiple privacy reviews performed by the third person. In some cases, the first person consents to privacy review of the communication by a third person who also belongs to the online community, and the third person is at an offline location which lies outside a list of territories specified by the first person.

Some methods further include the first person editing the communication, in response to the privacy review, before the communication reaches the second person. Some include the first person submitting the edited communication to another privacy review.

In some embodiments, the first person receives notice that their offline identity is hidden from any person who performs a privacy review on their communication. In some, the first person receives notice that their online identity is hidden from any person who performs a privacy review on their communication.

In some embodiments, the first person consents to privacy review of some images in communications from the first person to another person in the online community. In some, the first person consents to privacy review of all images in communications from the first person to another person in the online community. In some, the first person consents to privacy review of some online addresses in communications from the first person to another person in the online community, and online addresses include at least website addresses and email addresses. In some, the first person consents to privacy review of all online addresses in communications from the first person to another person in the online community. In some, the first person consents to privacy review of offline addresses in communications from the first person to another person in the online community.

In some embodiments, the first person receives notice that the privacy review includes automatically scanning a communication and then submitting the communication to a person for privacy review if a privacy concern trigger is found by the automatic scanning.

In the following examples particular attention is paid to anonymous social networking with offline encounter avoidance criteria, from a service provider's perspective.

Some embodiments include a method to help reduce the risk of offline encounters between members of an online community, the method including: obtaining a first avoidance criterion from a first member of the online community, the first avoidance criterion specifying an aspect of the first member's offline life that is designated by the first member to be shielded from the first member's online life; obtaining a second avoidance criterion from a second member of the online community, the second avoidance criterion specifying an aspect of the second member's offline life that is designated by the second member to be shielded from the second member's online life; and using the avoidance criteria to determine an offline encounter risk level of the two members, namely, a value which is based at least in part on the extent of overlap, if any, between their avoidance criteria.

In some embodiments, a method includes securely storing the obtained avoidance criteria such that a member's choice of avoidance criteria is not published in the online community to other members. Some embodiments include at least one of the following: securely storing offline identity information about members so that it is not published in the online community to other members; informing members that their offline name is not required and then allowing them to post communications in the online community without first providing their offline names.

Some embodiments include displaying to one of the members an indication of the number of members of the online community whose avoidance criteria overlap at least one avoidance criterion of that member, thereby allowing that member to estimate the reduction in online community access which would result from retaining the at least one avoidance criterion. An indication of the number of members may be numeric or visual (e.g., partially filled bar or map), and may be an exact count or an estimate.

Some embodiments include regulating communication between the first member and the second member in accordance with their offline encounter risk level, with a goal of reducing the risk that they will encounter each other offline as a result of communications in the online community.

In some embodiments, the obtaining steps obtain geographic territory designations, and communication between the two members is regulated in at least one of the following ways: direct communication between the two members is not supported by online community services when their respective geographic territory designations overlap; direct communication between the two members is suggested by an online community service when their respective geographic territory designations do not overlap.

In some embodiments, the obtaining steps obtain geographic territory designations, and the method further includes submitting a communication to the second member for privacy review when the respective geographic territory designations of the two members do not overlap, the communication being from the first member and also being not addressed to the second member by the first member.

In some embodiments, the obtaining steps obtain geographic territory designations, and the method further includes informing a member of at least one of the following: the territory in which the member resides should be designated, the territory in which the member resides must be designated, the territory in which the member resides will be automatically designated, at least one territory in which a member does not reside may be designated, a territory in which the member plans to travel should be designated, a territory in which the member plans to travel must be designated, a territory in which the member plans to travel may be designated.

In some embodiments, the obtaining steps obtain geographic territory designations, and the method further includes informing a member of at least one of the following: at least one territory should be designated, at least one territory must be designated, at least N territories should be designated (N being a stated value greater than one), at least N territories must be designated, territories which together have at least a specified total area should be designated, territories which together have at least a specified total area must be designated, territories which together have at least a specified total population should be designated, territories which together have at least a specified total population must be designated.

In some embodiments, the obtaining steps obtain geographic territory designations, and the method further includes automatically determining a member's likely residence and then including within that member's avoidance criteria at least one covering geographic territory, that is, a territory which includes the member's likely residence. In some, the steps of automatically determining the member's likely residence and including a covering geographic territory are performed transparently to the member.

In some embodiments, the obtaining steps obtain designations of at least one of the following: geographic territory, profession, a discussion topic listed as appropriate for an existing forum in the online community, gender, marital status, ethnicity, race, age, offline family name, offline personal name, organization membership, religious affiliation, membership in one or more specified online communities, thereby allowing members to designate characteristics of other members who they wish to avoid encountering.

A specified aspect of offline life may be past, present, and/or contemplated in the future; it need not come about to be specified as an avoidance criterion. It may even be intended solely as a buffer, e.g., specifying an entire state instead of merely specifying a county within the state even if there are no plans to travel outside the county.

In some embodiments, the first obtaining step obtains designations of multiple avoidance criteria from the first member, and the offline encounter risk level depends on at least two of those multiple avoidance criteria. In some, the first obtaining step obtains designations of multiple avoidance criteria from the first member in a Boolean expression. Boolean expression operators may be implicit, e.g., a blank space could be used to denote a logical AND operator.

Some embodiments include obtaining from the first member an indication of a first acceptable level of risk, which represents the first member's willingness to risk encountering offline some other member of the online community, and obtaining from the second member an indication of a second acceptable level of risk, which represents the second member's willingness to risk encountering offline some other member of the online community. Some include at least one of the following steps: hiding online community contact information of each of the two members from the other member after determining that the offline encounter risk level of the two members exceeds a level corresponding to the level of acceptable risk indicated by at least one of two members; displaying to at least one of the two members an online community username of the other member after determining that the offline encounter risk level of the two members is less than the level(s) of acceptable risk indicated by the two members; introducing the first member and the second member online using their respective usernames, after determining that the offline encounter risk level of the two members is less than the level(s) of acceptable risk indicated by the two members.

In some embodiments, the offline encounter risk level of the two members exceeds a predetermined value, and the method further includes hiding from each of the two members communications which are posted in the online community by the other of the two members. In some, the hiding step hides at least one of the following: a blog posting, a forum posting, a member profile, a member username, an electronic communication.

In some embodiments, the step of obtaining a first avoidance criterion occurs during registration of the first member, and that registration must be completed before the first member can post any communication to other members in the online community. In some, the step of obtaining a first avoidance criterion occurs after registration of the first member and modifies a previously obtained set containing at least one first member avoidance criterion, and the method further includes re-determining the offline encounter risk level of the two members in view of the modified avoidance criterion. In some embodiments, securely storing data does not preclude data access by authorized administrative personnel.

In the following examples particular attention is paid to anonymous social networking with offline encounter avoidance criteria, from an online community member's perspective.

Some embodiments include a method for an online community member to use to help reduce the risk of an offline encounter with another member of the online community, the method including the online community member: receiving notice that communications in an online community will be regulated in order to reduce online communication between community members who have overlapping avoidance criteria; and ratifying an avoidance set which includes at least one avoidance criterion.

In some embodiments, the ratifying step includes at least one of the following: the online community member selecting at least one avoidance criterion from displayed selectable avoidance criteria, the online community member communicating in the online community while subject to an avoidance criterion which is automatically included in the avoidance set. Some embodiments include the online community member reviewing selectable avoidance criteria displayed by an online community service provider. Some include the online community member receiving notice that a given member's avoidance set is not published in the online community to other members. Some include the online community member receiving an indication of the number of other members of the online community whose avoidance criteria overlap that member's avoidance set.

In some embodiments, the receiving notice step includes receiving notice that communications will be regulated with the goal of preventing any direct communication in the online community between community members who have overlapping avoidance criteria. In some, the receiving notice step includes receiving notice that communications in the online community will be regulated with the goal of hiding, from each of two members who have overlapping avoidance criteria, the online presence of the other of the two members.

Some embodiments include the online community member modifying the avoidance set by at least one of the following: selecting an avoidance criterion to include in the avoidance set, selecting an avoidance criterion to exclude from the avoidance set. In some, the avoidance set includes at least one geographic territory designation, thereby indicating that the online community member will have reduced communication in the online community with other members who may be physically located in the designated geographic territory(ies).

In some embodiments, the online community member is a first member, and the method further includes the first member consenting to allow privacy review of one of its online communications by a privacy reviewer if the privacy reviewer is also a member of the online community who has designated at least one geographic territory in a privacy reviewer avoidance set, and if the privacy reviewer avoidance set does not overlap the geographic territory(ies) designated in the first member's avoidance set. In some, the avoidance set includes at least the territory in which the online community member resides. In some, the avoidance set includes at least one territory in which the online community member does not reside but plans to travel.

In some embodiments, the avoidance set ratifying step includes selecting a geographic territory using a Boolean combination of constituent territories. In some, the ratifying step includes selecting designations of at least one of the following: geographic territory, profession, a discussion topic listed as appropriate for an existing forum in the online community, gender, marital status, ethnicity, race, age, offline family name, offline personal name, organization membership, religious affiliation, specified online community membership, thereby allowing the online community member to designate characteristics of other members who the online community member wishes to avoid encountering. In some, the ratifying step includes selecting designations of multiple avoidance criteria combined in a Boolean expression.

Some embodiments include the online community member accessing the online community through a username which has been subjected to privacy review to reduce the risk that it will disclose information about the online community member's offline identity.

Some embodiments include the online community member specifying an acceptable level of risk, which represents the member's willingness to risk encountering offline some other member of the online community.

In some embodiments, the online community member is a first member, and the method includes the first member receiving an introduction to another online community member whose avoidance criteria do not overlap the first member's avoidance set. In some, the online community member is a first member, and the method includes the first member attempting unsuccessfully to communicate directly in the online community with another online community member whose avoidance criteria overlaps the first member's avoidance set.

In the following examples, particular attention is paid to privacy protection through username restrictions.

Some embodiments include a method for use by an online service provider to help maintain the privacy of offline identities of online users, the method including: testing a proposed username by comparing at least a portion of its content to a set of personal identification information tokens; and accepting the proposed username if it satisfies a predetermined privacy criterion, the privacy criterion being defined in terms of matches to personal identification information tokens.

In some embodiments, the testing step compares proposed username content to tokens using at least one of the following: an interactive question-and-answer session; an automatic string operation. In some embodiments, the testing step compares proposed username content to tokens obtained from personal information supplied by an online user, and the privacy criterion is defined in terms of avoiding matches to those tokens. In some, the testing step compares proposed username content to tokens obtained from at least one of: a directory of offline addresses, a directory of online addresses, a directory of names, a directory of phone numbers, and the privacy criterion is defined in terms of avoiding matches to those tokens. In some, the testing step compares proposed username content to tokens obtained from at least one of: a database of registrations, a database of licenses, a database of grants, a database of government records, and the privacy criterion is defined in terms of avoiding matches to those tokens. In some, the testing step compares proposed username content to tokens obtained from a collection of fictional names, and the privacy criterion is defined in terms of matching those tokens. In some, the testing step compares proposed username content to a result of an online search engine search.

Some embodiments include accepting the proposed username from an online user before testing the proposed username. Some include automatically generating the proposed username before testing the proposed username.

Some embodiments include a method for username selection which reduces the risk that a username will disclose information about an online user's offline identity, the method including: receiving a question regarding a proposed username and its relation, if any, to the online user's offline identity; and answering the question. Some include receiving additional questions regarding the proposed username and its relation, if any, to the online user's offline identity, and answering the additional questions.

Some embodiments include proposing a username. Some include specifying an acceptable level of risk that the proposed username will disclose information about the online user's offline identity. Some include stating that the proposed username is a fictional name.

Some embodiments include receiving and answering at least one of the following questions: whether the proposed username contains any part of your name, whether the proposed username contains any part of the name of anyone in your family, whether the proposed username contains any part of the name of anyone you have met, whether the proposed username contains the name of a pet, whether the proposed username contains a nickname, whether the proposed username contains the name of your employer, whether the proposed username contains the name of a business you are connected with, whether the proposed username refers to your religious or spiritual beliefs, whether the proposed username refers to your political beliefs, whether the proposed username refers to any organization to which you belong or which you support, whether the proposed username contains any part of any of your email addresses, whether the proposed username contains any part of a website address, whether the proposed username contains any part of any of your offline addresses, whether the proposed username contains any part of any of your phone numbers, whether the proposed username refers to any of your physical characteristics (e.g., height, weight, gender, race, hair color, eye color, tattoos, disabilities), whether the proposed username refers to your ethnicity. Some embodiments include reading part of a search engine search result and being asked whether it pertains to you or anyone you know.

In the following examples, particular attention is paid to privacy protection through username mapping.

Some embodiments include a method for use by an online service provider to help maintain the privacy of offline identities of online users, the method including: assigning a first user of an online service a private username which is not kept hidden from the first user but is kept hidden from other users of the online service; and assigning the first user at least one public username which is kept hidden from the first user but is not kept hidden from at least some other users of the online service.

Some embodiments include receiving from the first user content directed to at least one other user; and displaying the content together with an attribution which depends on the online service account used, namely, showing an attribution to the private username when the first user is logged in and showing an attribution to a public username when another user is logged in.

Some embodiments include associating geographic territories with users of the online service; the content is hidden from display to other users whose associated geographic territory overlaps the first user's associated geographic territory. Some include associating geographic territories with users of the online service, and all public usernames assigned to the first user are kept hidden from other users whose associated geographic territory overlaps the first user's associated geographic territory.

In some embodiments, at least two different public usernames of a given user are in active use and displayed in each of at least two respective geographic territories at one time.

In some embodiments, the private username is chosen by the online user, in some it is assigned by the system, and in some it is chosen by the user subject to approval by the system. The public names are generated by the system. Different public (aka external) usernames of a given user may be used in different geographic regions and/or in different forums. The system may autogenerate usernames by combining root words, numeric values, and in some cases associated images (which do not contain realistic user likenesses). Hiding a username does not necessarily preclude revealing it to an authorized administrator, but in some embodiments the correlation between users and usernames is not readily determined even by such administrators.

Conclusion

Although particular embodiments are expressly illustrated and described herein as methods or systems, it will be appreciated that discussion of one type of embodiment also generally extends to other embodiment types. For instance, the descriptions of methods in connection with FIGS. 2-4 also help describe systems like those described in connection with FIG. 1, and vice versa. Likewise, example method embodiments help describe system embodiments that operate according to those methods, product embodiments produced by those methods (such as a communication excerpt 150 with privacy concerns highlighted, or a listing showing personal territories to avoid meeting members from), and configured media embodiments in which a medium is configured by data and instructions to perform those methods. It does not follow that all limitations from a given embodiment are necessarily read into another.

Components, steps, and other aspects of different examples given herein may be combined to form a given embodiment.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification. Repeated claim language may be inserted outside the claims as needed.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for use by a consenting member of an online community, the method comprising the consenting member: having an online identity which is published within the online community;

owning an offline identity which is not published within the online community, and which includes characteristics of the consenting member's offline identity which are designated by electronically stored data that is not published within the online community, the characteristics comprising at least two of the following: geographic territory, profession, a discussion topic listed for an existing forum in the online community, gender, marital status, ethnicity, race, age, organization membership, or religious affiliation; and electronically manifesting consent to regulated review of electronic communications between the consenting member and at least one other member of the online community, the consent including consent to reducing offline identity disclosure risk by comparing electronic communications with at least two characteristics of the consenting member's offline identity which are designated by electronically stored data that is not published within the online community; and electronically obtaining a result of regulated review of the electronic communications.

2. The method of claim 1, further comprising the consenting member receiving a notice that the regulated review is based at least in part on automatically scanning the electronic communications.

3. The method of claim 1, further comprising the consenting member receiving a notice that the regulated review is based at least in part on scanning the electronic communications before delivery of the electronic communications to an intended receiver.

4. The method of claim 1, further comprising the consenting member receiving a notice that the regulated review is also based at least in part on scanning the electronic communications for at least one of the following: personal name, family name, phone number, offline address, online address, geographic name, or landmark name.

5. The method of claim 1, further comprising the consenting member receiving a notice that the regulated review is also based at least in part on scanning the electronic communications for at least one of the following: a question seeking geographic information, or a question seeking employment information.

6. The method of claim 1, further comprising the consenting member receiving a notice that the regulated review is also based at least in part on scanning the electronic communications for an indication of at least one of the following: title, or profession.

7. The method of claim 1, further comprising the consenting member editing at least one of the electronic communications after obtaining the regulated review and before delivery of the edited electronic communication(s) to an intended receiver.

8. The method of claim 1, further comprising the consenting member editing at least one of the electronic communications after obtaining the regulated review and then electronically submitting the edited electronic communication(s) for regulated review.

9. A computer system configured for use by a consenting member of an online community to execute computer-executable instructions, the consenting member having an online identity in the online community, the system comprising:

a memory configured with the computer-executable instructions; and a processor, coupled with the memory, that executes the computer-executable instructions for performing a method comprising the following steps:

the member electronically manifesting consent to regulated review of electronic communications between the consenting member and at least one other member of the online community, the consent including consent to reduce offline identity disclosure risk by comparing electronic communications with at least two characteristics of an offline identity of the consenting member which are designated by electronically stored data that is not published within the online community, the offline identity having at least one characteristic which is not present in the online identity, the offline identity characteristics comprising at least two of the following: geographic territory, profession, a discussion topic listed for an existing forum in the online community, gender, marital status, ethnicity, race, age, organization membership, or religious affiliation; and the consenting member electronically obtaining a result of regulated review of the electronic communications.

10. The system of claim 9, wherein the processor coupled with the memory executes computer-executable instructions for the consenting member to electronically receive a notice that the regulated review is performed at least in part by a human reviewer who also belongs to the online community.

11. The system of claim 9, wherein the processor coupled with the memory executes computer-executable instructions for the consenting member to electronically provide an authority within the online community with an opinion in response to regulated review which was performed at least in part by a human reviewer who is not the consenting member.

12. The system of claim 9, wherein the processor coupled with the memory executes computer-executable instructions for the consenting member to electronically receive a reputation summary of a human reviewer, the reputation summary being a response to opinions of online community members about regulated reviews performed by the human reviewer.

13. The system of claim 9, wherein the processor coupled with the memory executes computer-executable instructions for the consenting member to electronically receive at least one of the following: a notice that the offline identity of the consenting member is kept hidden from a human reviewer who performs regulated review, or a notice that the online identity of the consenting member is kept hidden from a human reviewer who performs regulated review.

14. A configured storage device configured with data and instructions to cause a processor and a memory to perform steps of a method for use by a consenting member of an online community, the member having an online identity which is published within the online community, the member owning an offline identity which is not published within the online community, the method steps comprising:

the member electronically manifesting consent to regulated review of electronic communications between the consenting member and at least one other member of the online community, the consent including consent to reducing offline identity disclosure risk by comparing electronic communications with at least two characteristics of the consenting member's offline identity which are designated by electronically stored data that is not published within the online community, the characteristics comprising at least three of the following: geographic territory, profession, a discussion topic listed for an existing forum in the online community, gender, marital status, ethnicity, race, age, organization membership, or religious affiliation; and the consenting member electronically obtaining a result of the privacy regulated review of the electronic communications by the privacy reviewer.

15. The configured storage device of claim 14, wherein the consenting member electronically manifests consent specifying that website addresses and email addresses in electronic communications are subject to regulated review.

16. The configured storage device of claim 14, wherein the consenting member electronically manifests consent specifying that offline addresses in electronic communications are subject to regulated review.

17. The configured storage device of claim 14, wherein the consenting member electronically manifests consent specifying that images in electronic communications are subject to regulated review.

18. The configured storage device of claim 14, wherein the consenting member is notified that the regulated review is performed at least in part by a human reviewer.

19. The configured storage device of claim 14, wherein the consenting member electronically receives notice that regulated review includes submission of the electronic communication to a human reviewer if a privacy concern trigger is found by automatic scanning of an electronic communication.

20. The configured storage device of claim 14, wherein the method further comprises the consenting member electronically specifying at least one geographic region, and the consenting member electronically manifests consent to regulated review of the electronic communication by a human reviewer who resides outside the at least one geographic region.

21. The configured storage medium of claim 14, wherein the method further comprises the consenting member electronically specifying at least one regulated reviewer selection criterion.

* * * * *